(12) United States Patent
Sharma et al.

(10) Patent No.: US 12,223,642 B2
(45) Date of Patent: Feb. 11, 2025

(54) DEEP LEARNING MODEL TO PREDICT DATA FROM AN IMAGE

(71) Applicant: Rakuten Group, Inc., Tokyo (JP)

(72) Inventors: Shreya Sharma, Uttarakhand (IN); Abhishek Vahadane, Maharashtra (IN); Srikanth Ragothaman, Tamilnadu (IN); Shantanu Majumdar, West Bengal (IN)

(73) Assignee: Rakuten Group, Inc., Tokyo (JP)

( * ) Notice: Subject to any disclaimer, the term of this patent is extended or adjusted under 35 U.S.C. 154(b) by 495 days.

(21) Appl. No.: 17/306,170

(22) Filed: May 3, 2021

(65) Prior Publication Data

US 2022/0351366 A1 Nov. 3, 2022

(51) Int. Cl.
*G06T 3/40* (2024.01)
*G06N 3/08* (2023.01)
*G06T 7/00* (2017.01)
*G06T 7/73* (2017.01)

(52) U.S. Cl.
CPC ............. *G06T 7/0012* (2013.01); *G06N 3/08* (2013.01); *G06T 3/40* (2013.01); *G06T 7/73* (2017.01); *G06T 2207/10056* (2013.01); *G06T 2207/20021* (2013.01); *G06T 2207/20081* (2013.01)

(58) Field of Classification Search
CPC ........... G06T 7/0012; G06T 3/40; G06T 7/73; G06T 2207/10056; G06T 2207/20021; G06T 2207/20081; G06T 2207/30024; G06N 3/08; G06V 10/82; G06V 20/698; G06V 20/695
See application file for complete search history.

(56) References Cited

U.S. PATENT DOCUMENTS

| | | | |
|---|---|---|---|
| 2019/0065817 A1* | 2/2019 | Mesmakhosroshahi | G06V 20/698 |
| 2020/0394459 A1* | 12/2020 | Xu | G06N 3/045 |
| 2022/0036549 A1* | 2/2022 | Yoo | G16B 20/00 |
| 2022/0036550 A1* | 2/2022 | Zhang | G06N 3/04 |

\* cited by examiner

*Primary Examiner* — Wesley J Tucker
*Assistant Examiner* — Han Hoang
(74) *Attorney, Agent, or Firm* — Sughrue Mion, PLLC

(57) ABSTRACT

A method, computer program, and computer system is provided for predicting data from an image. An image is divided into one or more patch images. Spatial features corresponding to the one or more patch images are compressed. Output data corresponding to the compressed spatial features is predicted. The output data is predicted based on minimizing one or more loss functions corresponding to the compressed spatial features.

11 Claims, 6 Drawing Sheets

DEEP LEARNING MODEL TO PREDICT DATA FROM AN IMAGE

BACKGROUND

This disclosure relates generally to field of data processing, and more particularly to machine learning.

Binary files, such as images, animations, and sounds, have allowed for the creation and encoding of large amounts of data. For example, in the field of medicine, microscopy image data and molecular data are extensively used for cancer research. In this case, non-tabular microscopy image data provides information about changes in cell structure and patterns, while tabular molecular data provides information about changes in gene types.

Digital pathology has made it possible to extract information about biological components from whole slide images. Hematoxylin and eosin (H&E) is a common staining technique used in pathology labs across the world. In a typical implementation, hematoxylin dye stains nuclei by blue while eosin stains cytoplasm and extracellular matrix by pink. Cells and nuclei are the basic elements of tissue, and the statistics of such components can be utilized for novel biomarker development as well as for precise diagnosis. Nucleus size, shape, density, local texture, spatial features in the neighborhood of nucleus and local tissue structure (glands) provide important clues about cancerous activity in the whole slide images.

SUMMARY

Embodiments relate to a method, system, and computer readable medium for predicting features in binary files. According to one aspect, a method for predicting features in binary files is provided. The method may include dividing an image into one or more patch images. Spatial features corresponding to the one or more patch images are compressed. Output data corresponding to the compressed spatial features is predicted. The output data is predicted based on minimizing one or more loss functions corresponding to the compressed spatial features.

According to another aspect, a computer system for predicting features in binary files is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include dividing an image into one or more patch images. Spatial features corresponding to the one or more patch images are compressed. Output data corresponding to the compressed spatial features is predicted. The output data is predicted based on minimizing one or more loss functions corresponding to the compressed spatial features.

According to yet another aspect, a computer readable medium for predicting features in binary files is provided. The computer readable medium may include one or more computer-readable storage devices and program instructions stored on at least one of the one or more tangible storage devices, the program instructions executable by a processor. The program instructions are executable by a processor for performing a method that may accordingly include dividing an image into one or more patch images. Spatial features corresponding to the one or more patch images are compressed. Output data corresponding to the compressed spatial features is predicted. The output data is predicted based on minimizing one or more loss functions corresponding to the compressed spatial features.

BRIEF DESCRIPTION OF THE DRAWINGS

These and other objects, features and advantages will become apparent from the following detailed description of illustrative embodiments, which is to be read in connection with the accompanying drawings. The various features of the drawings are not to scale as the illustrations are for clarity in facilitating the understanding of one skilled in the art in conjunction with the detailed description. In the drawings.

DETAILED DESCRIPTION

Figure 1:
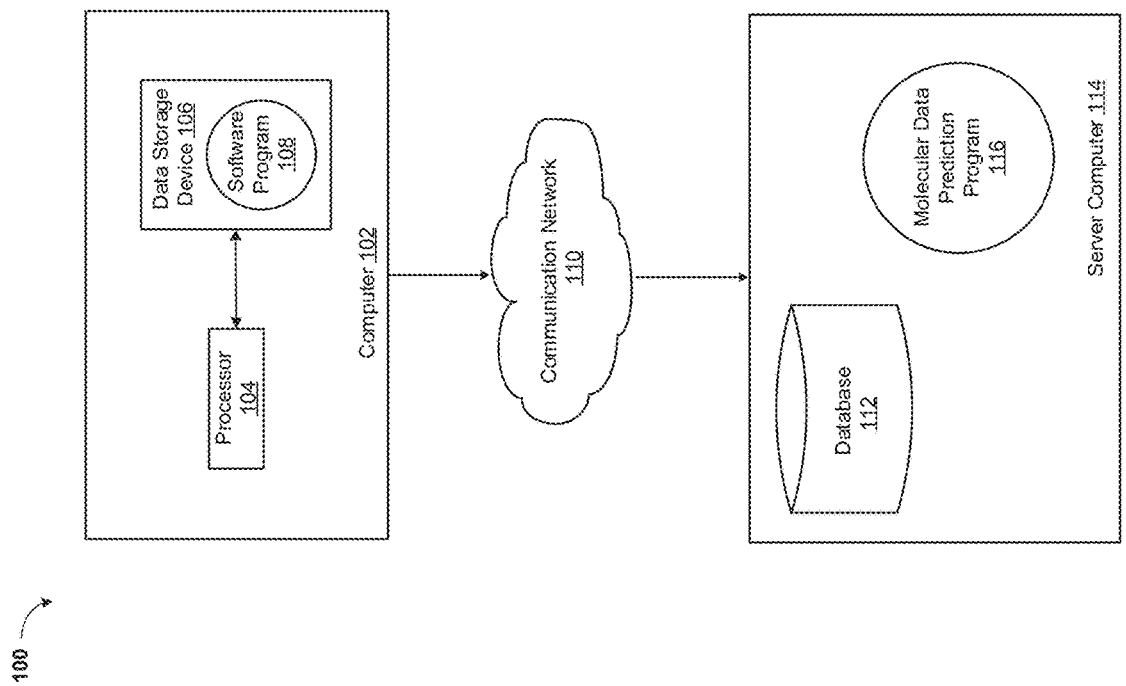
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. Those structures and methods may, however, be embodied in many different forms and should not be construed as limited to the exemplary embodiments set forth herein. Rather, these exemplary embodiments are provided so that this disclosure will be thorough and complete and will fully convey the scope to those skilled in the art. In the description, details of well-known features and techniques may be omitted to avoid unnecessarily obscuring the presented embodiments.

Embodiments relate generally to the field of data processing, and more particularly to machine learning. The following described exemplary embodiments provide a system, method and computer program to, among other things, predict molecular data based on H&E image data. Therefore, some embodiments have the capacity to improve the field of computing by allowing for RNA data to be predicted by a computer using readily available, simple, and inexpensive diagnostic methods.

As described above, binary files, such as images, animations, and sounds, have allowed for the creation and encoding of large amounts of data. For example, in the field of medicine, microscopy image data and molecular data are extensively used for cancer research, and digital pathology has made it possible to extract information about biological components from whole slide images. Hematoxylin and eosin (H&E) is a common staining technique used in pathology labs across the world, to assess nucleus size, shape, density, local texture, spatial features in the neighborhood of nucleus and local tissue structure (glands). These features provide important clues about cancerous activity in the whole slide images. In cancer diagnosis and treatment, molecular profiling of patients is in increasing demand to take advantage of targeted or biomarker-based therapies. For example, patients with lung cancer who have EGFR mutations or patients with melanoma who have BRAF mutations have received approval for targeted therapies by the US Food and Drug Administration.

However, measuring molecular data is a very costly and time-consuming clinical procedure due to expensive equipment, long analysis time and tissue sample dependency. On the other hand, H&E techniques are inexpensive and may constitute a relatively simple procedure. Studies have shown that genetic changes in molecular data cause cell-structure changes in H&E data, and thus, the two data types are correlated and linked. It may be advantageous, therefore, to predict molecular data using features from captured microscopy image data (such as H&E image data).

Microscopy and medical image data, however, can be very large in size, resulting in difficulty in loading these images into analysis models, such as deep learning models trained to predict the molecular data (e.g., RNA data), due to computational constraints. One method of overcoming these constraints is patch-based extraction, in which a random sample of patches or tiles are obtained from the image and then analysis results are aggregated over those patches or tiles. For example, a deep learning model may be used to predict the molecular data from each patch (feature extraction), and a patch aggregator may thereafter aggregate (e.g., average) the results for all of the patches. Accordingly, full image prediction may be achieved using a deep learning model by dividing the image into patches for input to the model and then aggregating the results.

The patch-based approach has a number of limitations. First, the patches are extracted randomly from the image. In reality, however, molecular data is not uniform and the random sample of patches may not be an accurate reflection of the features across the entire image. If, for examples, one of the patches has excessive noise or does not have sufficient information, then the aggregated result would be erroneous and would not accurately reflect the molecular data (e.g., RNA data). Further, because the patches are extracted randomly from the image, the features therein are treated individually, and the spatial relationships between the patches are lost. The spatial relationships, however, are important for molecular data prediction, particularly for identifying important areas of the image in terms of the molecular data. Another problem is that the deep learning model for feature extraction may be pre-trained with images unrelated to medical or microscopy images. For example, a deep learning model trained with images of dogs or cars may be applied to medical images for feature extraction. Given the extreme differences between the datasets (images of dogs versus medical images), the feature extraction is not optimal.

Aspects of exemplary embodiments overcome these problems by incorporating a spatial feature compressor that retains the spatial relationships between extracted patches, and a deep learning regressor that inputs compressed features and outputs predicted molecular data. With this framework, the assumption that each patch has molecular data information is avoided; both the local cellular features and the global spatial features for inferring molecular data at the whole-slide level are used. Additionally, aspects of exemplary embodiments provide end-to-end training of the feature compressor and deep-learning regressor using combined loss, as opposed to a model pre-trained with unrelated datasets. As a result, the accuracy of the feature extraction and prediction of molecular data improves.

Aspects are described herein with reference to flowchart illustrations and/or block diagrams of methods, apparatus (systems), and computer readable media according to the various embodiments. It will be understood that each block of the flowchart illustrations and/or block diagrams, and combinations of blocks in the flowchart illustrations and/or block diagrams, can be implemented by computer readable program instructions.

The following described exemplary embodiments provide a system, method and computer program that predicts data (e.g., molecular data) from an image (e.g., from H&E microscopy image data. While exemplary embodiments herein are described with reference to predicting molecular data from H&E microscopy data in humans, it is understood that the present disclosure is not limited thereto and may be applicable to predicting any type of data indicated by an image of any type, based on features extracted from the image.

Referring now to FIG. 1, a functional block diagram of a networked computer environment illustrating a molecular data prediction system 100 (hereinafter "system") for predicting molecular data based on H&E images is provided. It should be appreciated that FIG. 1 provides only an illustration of one implementation and does not imply any limitations with regard to the environments in which different embodiments may be implemented. Many modifications to the depicted environments may be made based on design and implementation requirements.

The system 100 may include a computer 102 and a server computer 114. The computer 102 may communicate with the server computer 114 via a communication network 110 (hereinafter "network"). The computer 102 may include a processor 104 and a software program 108 that is stored on a data storage device 106 and is enabled to interface with a user and communicate with the server computer 114. As will be discussed below with reference to FIG. 5 the computer 102 may include internal components 800A and external components 900A, respectively, and the server computer 114 may include internal components 800B and external components 900B, respectively. The computer 102 may be, for example, a mobile device, a telephone, a personal digital assistant, a netbook, a laptop computer, a tablet computer, a desktop computer, or any type of computing devices capable of running a program, accessing a network, and accessing a database.

The server computer 114 may also operate in a cloud computing service model, such as Software as a Service (SaaS), Platform as a Service (PaaS), or Infrastructure as a Service (IaaS), as discussed below with respect to FIGS. 6 and 7. The server computer 114 may also be located in a cloud computing deployment model, such as a private cloud, community cloud, public cloud, or hybrid cloud.

The server computer 114, which may be used for predicting features in binary files is enabled to run a Molecular Data Prediction Program 116 (hereinafter "program") that may interact with a database 112. The Molecular Data Prediction Program method is explained in more detail below with respect to FIGS. 3A and 3B. In one embodiment, the computer 102 may operate as an input device including a user interface while the program 116 may run primarily on server computer 114. In an alternative embodiment, the program 116 may run primarily on one or more computers 102 while the server computer 114 may be used for processing and storage of data used by the program 116. According to another embodiment, the program 116 may run on one or more computers 102 and data used by the program 116 may be stored in the one or more computers 102. In this case, the server computer 114 may be omitted. It should be noted that the program 116 may be a standalone program or may be integrated into a larger molecular data prediction program.

Further, it should be noted that processing for the program 116 may, in some instances, be shared amongst the computers 102 and the server computers 114 in any ratio. In another embodiment, the program 116 may operate on more than one computer, server computer, or some combination of computers and server computers, for example, a plurality of computers 102 communicating across the network 110 with a single server computer 114. In another embodiment, for example, the program 116 may operate on a plurality of server computers 114 communicating across the network 110 with a plurality of client computers. Alternatively, the program may operate on a network server communicating across the network with a server and a plurality of client computers.

The network 110 may include wired connections, wireless connections, fiber optic connections, or some combination thereof. In general, the network 110 can be any combination of connections and protocols that will support communications between the computer 102 and the server computer 114. The network 110 may include various types of networks, such as, for example, a local area network (LAN), a wide area network (WAN) such as the Internet, a telecommunication network such as the Public Switched Telephone Network (PSTN), a wireless network, a public switched network, a satellite network, a cellular network (e.g., a fifth generation (5G) network, a long-term evolution (LTE) network, a third generation (3G) network, a code division multiple access (CDMA) network, etc.), a public land mobile network (PLMN), a metropolitan area network (MAN), a private network, an ad hoc network, an intranet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of system 100 may perform one or more functions described as being performed by another set of devices of system 100.

Figure 2:
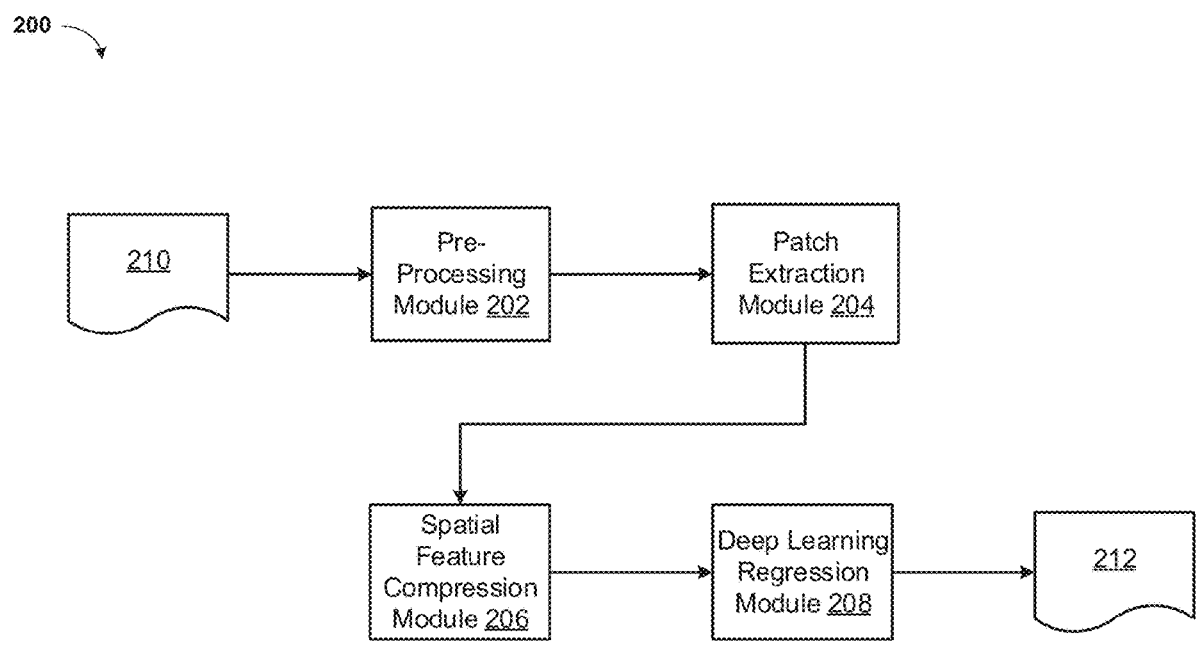
FIG. 2 is a block diagram of a system for predicting data, according to at least one embodiment.

Referring now to FIG. 2, a block diagram of a data prediction system 200 is depicted. For example, the data prediction system 200 may be a molecular data prediction system that predicts molecular data from a microscopy image, though it is understood that the present disclosure is not limited to any particular type of data or image. The data prediction system 200 may include, among other components, a pre-processing module 202, a patch extraction module 204, a spatial feature compression module 206, and a deep learning regression module 208.

The pre-processing module 202 (or pre-processor) processes input data 210 (e.g., microscopy image data such as an H&E image or an immunofluorescence image). The input data 210 may include, among other things, primary tumor samples for head and neck squamous cell carcinoma (HNSCC), for which both H&E whole slide images and RNA sequence data may be available. However, it may be appreciated that data corresponding to substantially any pathology may be used. HNSCC may include cancers of multiple sites in head and neck region. The pre-processing module 202 may apply pre-processing on the input data 210 by downsampling the input data 210 (e.g., by a factor of four) and apply a threshold (e.g., Otsu threshold) to separate tissue regions from background regions. According to an embodiment, the pre-processing may include at least one of downsampling to reduce image size, Otsu thresholding (e.g., to remove background from a tissue region), stain normalization to normalize stain colors across different images, and contrast enhancement to enhance image features (e.g., tissue structure and cells).

The patch extraction module 204 may extract patches from the pre-processed image data. By way of example, and not of limitation, the patches may be of size 128 pixels by 128 pixels, which may be a common patch size used in histopathology image analysis. The extracted patches may also include, among other things, location data from the corresponding tissue regions. The patch extraction module 204 (or patch extractor) may extract one or more patch images from the input data 210. In the present embodiment, the patch extraction module 204 extracts patches of the entirety of the image, as opposed to a random sample of patches.

Because the patches correspond to the full image, their sizes may be too large to input into the feature extraction model. Thus, the spatial feature compression module 206 (or spatial feature compressor) may compress the patches into multiple features. After the input data 210 may be converted to patches, the spatial feature compression module 206 may extract features from each patch to represent a low-dimensional pixel space into a high-dimensional feature space. To extract features while retaining the spatial-contextual information, the spatial feature compression module 206 may employ a Neural Image Compression (NIC) technique for compressing the whole slide images. NIC may use a neural network to map patches into feature vectors and place each feature vector into an array that keeps the original spatial arrangement intact such that neighboring feature vectors in the array represent neighboring patches in the original whole slide images. Several neural networks architectures have been used in NIC. For example, a variational auto-encoder (VAE) may be used for medical image classification. The spatial feature compression module 206 may use a pre-trained VAE trained on H&E datasets for obtaining compressed feature representation. For example, the patches may be compressed using a plurality of filters corresponding to different features (e.g., 64 filters to output a stack of 64 images). In other words, according to the present exemplary embodiment, the image may be compressed though the features may be expanded. Spatial information and other useful information can thereby be preserved for the prediction model.

The deep learning regression module 208 (or deep learning regressor) inputs the compressed feature images and outputs predicted molecular data 212 for the full image. As compared to the random patch-based approach, more information is fed to the deep learning regression module 208 (including spatial relationships), thereby providing more accurate molecular data prediction results. Specifically, the deep learning regression module 208 may input the compressed feature representation of the H&E whole slide images as feature vectors and may generate RNA sequence information, such as gene expression values, as the predicted molecular data 212. The feature vectors may be resized to a size of, for example, 224 pixels by 224 pixels with 128 input channels, which may correspond to the length of each feature vector. The deep learning regression module 208 may contain one or more convolutional layers of kernel size (3,3) with stride=1 and padding=1 each followed by a batch-normalization layer and a max-pooling layer with stride=2 and padding=2. In addition, the deep learning regression module 208 may include one or more hidden fully-connected layers and an output fully-connected layer. The convolutional layers learn local patch-level and global image-level features through hierarchical learning process and the fully-connected layers regress the gene values based on the learnt features. The deep learning regression module 208 may optimize the loss function of the proposed deep learning model with mean-squared error (MSE) loss function which computes the mean of the summation of squared difference between true and predicted RNA sequence gene expression values over the whole slide images used during training.

Further, the molecular data prediction system 200 may include end-to-end training of the spatial feature compression module 206 and the deep learning regression module 208 using combined loss. For example, the regression loss function may be defined as Equation 1:

$$\Sigma_{i=1}^{N}(y_{pred}-y_{true})^2;$$

the feature compression loss function may be defined as Equation 2:

$$(y_{pred}-y_{true})^2;\text{ and}$$

the combined loss function may be defined as Equation 3:

$$\Sigma_{i=1}^{N}(x_{pred}-x_{true})^2+(y_{pred}-y_{true})^2,$$

where i is the ith patch of the image, N is a total number of patches from one image, $x_{pred}$ is the reconstructed patch, $x_{true}$ is the actual patch, $y_{pred}$ is the predicted value of molecular data at the image-level, and $y_{true}$ is the actual value of molecular data at the image-level.

According to one or more embodiments, parameters (e.g., weights) of the first model and the second model may be adjusted (or optimized) based on the first and second loss functions, i.e., a combined loss function. As a result, feature extraction is improved since the first model for feature extraction is trained using relevant images, e.g., H&E images, instead of unrelated datasets that are used generically to pre-train related art models. Additionally, features are optimized specifically for the relevant task (e.g., for the task of molecular data prediction in the above-described embodiments). This leads to improved accuracy of the prediction task. Without the combined loss according to embodiments, features may be optimized for unrelated tasks such as classification/segmentation, and may not be useful for an intended task, e.g., molecular data prediction. Further, by implementing a combined loss according to embodiments, training is faster since the tasks of both models are trained together in an end-to-end framework instead of sequentially or a single model or task at a time.

Figure 3A:
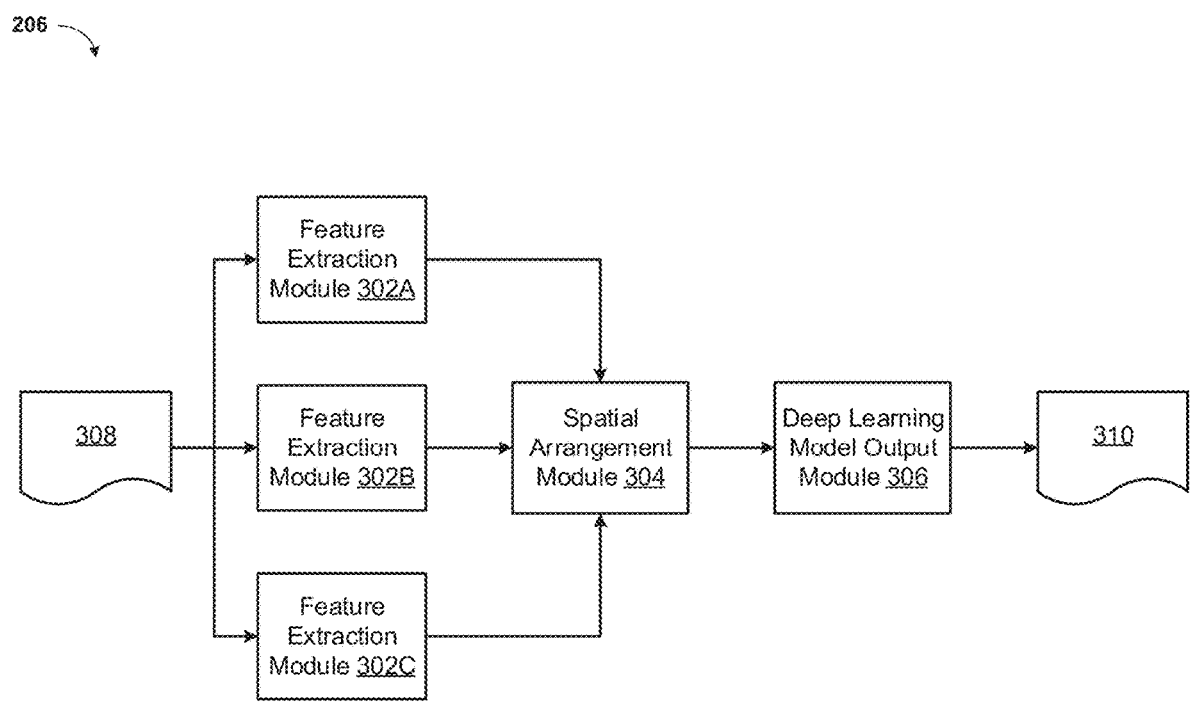
FIGS. 3A and 3B are block diagrams of a spatial feature compression module, according to at least one embodiment.

Referring now to FIG. 3A, a block diagram of a spatial feature compression module 206 as illustrated in FIG. 2, according to one or more embodiments, is depicted. The spatial feature compression module 206 as depicted in FIG. 3A may be neural image compression based. The spatial feature compression module 206 may include, among other components, feature extraction modules 302A-C (or feature extractors), a spatial arrangement module 304 (or spatial arranger), and a deep learning model output module 306 (or a deep learning model). The feature extraction modules 302A-C may extract features from the received input H&E data 308. The spatial arrangement module 304 may generate compressed images based on the spatial positions of the extracted features. The deep learning model output module 306 may predict and output RNA data 310 from the compressed images.

Figure 3B:
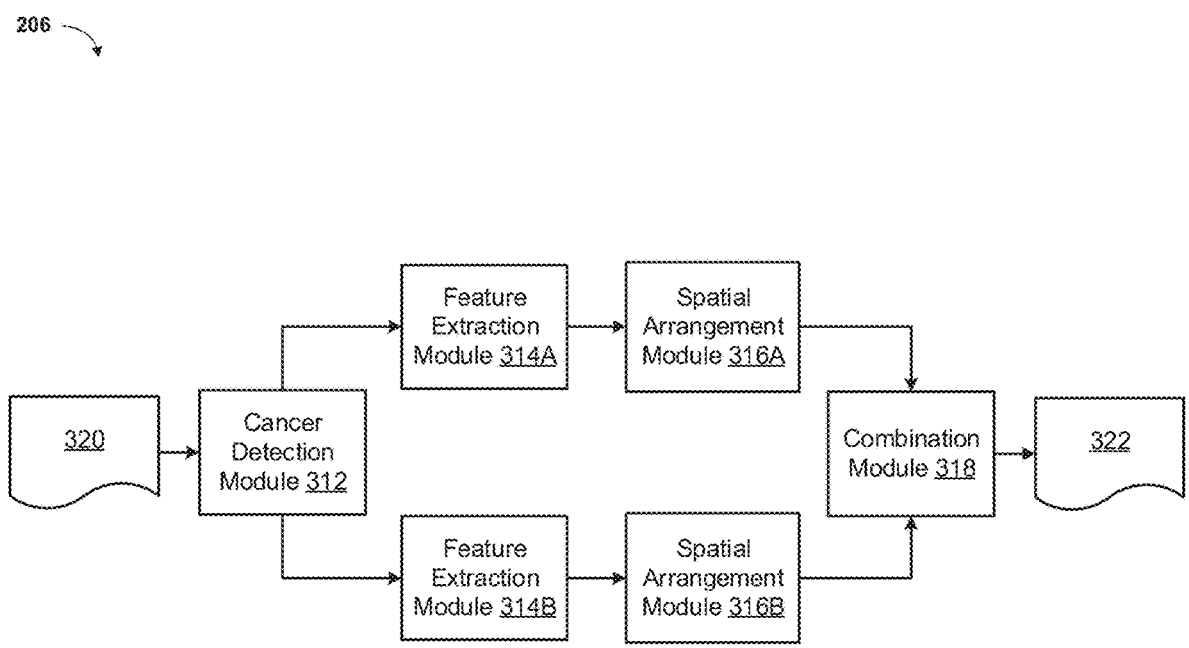

Referring now to FIG. 3B, a block diagram of a spatial feature compression module 206 as illustrated in FIG. 2, according to one or more embodiments, is depicted. The spatial feature compression module 206 as depicted in FIG. 3B may be tumor region detection based. The spatial feature compression module 206 may include, among other things, a cancer detection module 312 (or cancer detector), feature extraction modules 314A-B (or feature extractors), spatial arrangement modules 316A-B (or spatial arrangers), and combination module 318 (or combiner). It may be appreciated that cancer patch and normal patches may have different spatial patterns and morphology in an H&E image. Thus, the cancer detection module 312 may allow for separate learning of such patterns in order to enhance a compressed representation of the input H&E data 320. Accordingly, the feature extraction module 314A may extract features from cancer patches while the feature extraction module 314B may extract features from normal patches. The spatial arrangement modules 316A and 316B may generate compressed cancer patch features and compressed normal patch features, respectively. The combination module 318 may combine the compressed cancer and normal patch features and may output RNA data 322 based on a deep learning model.

Figure 4:
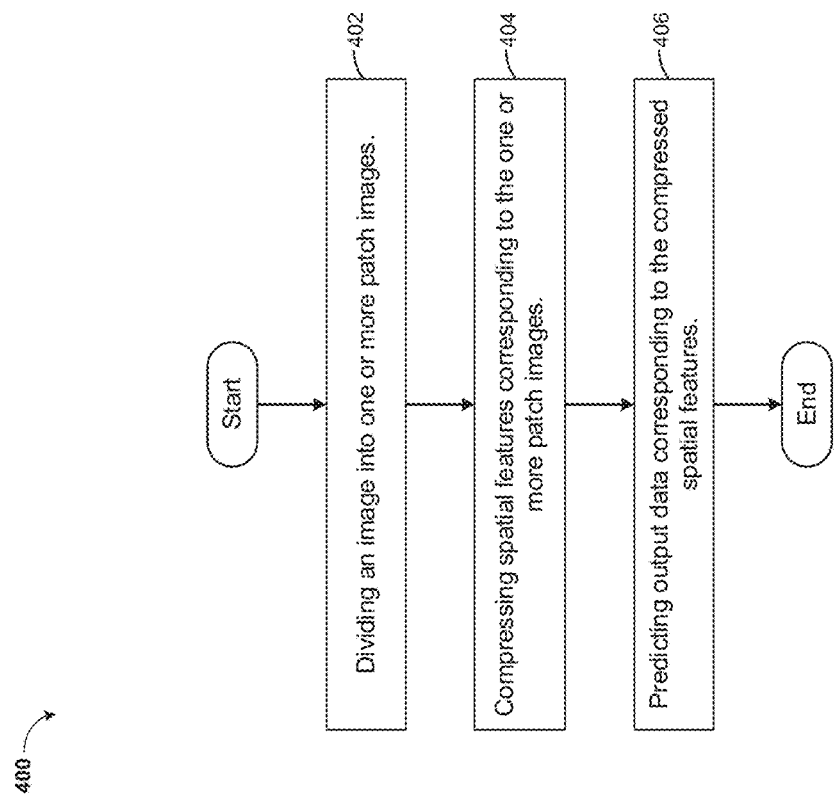
FIG. 4 is an operational flowchart of a method for predicting molecular data, according to at least one embodiment.

Referring now to FIG. 4, an operational flowchart illustrating the steps of a method 400 carried out by a program that predicts molecular data is depicted.

At 402, the method 400 may include dividing an image into one or more patch images. In the present embodiment, the patch extraction module 204 extracts patches of the entirety of the image, as opposed to a random sample of patches. Thus, the image as a whole may be used for data prediction, thereby preserving more complete and more robust information (such as spatial relationships of the features within the image) resulting in a more accurate prediction.

At 404, the method 400 may include compressing spatial features corresponding to the one or more patch images. Here, a first model (e.g., a machine learning model such as a spatial feature compressor) may be used to compress feature expression images (e.g., compress H&E features) from the patch images.

At 406, the method 400 may include predicting output data corresponding to the compressed spatial features. In particular, a second model (e.g., a machine learning model such as a deep learning regressor) may be used to predict the output data (such as molecular data or other feature data depending on the type of image).

According to one or more embodiments, a combined loss function may be used for end-to-end training of the system. That is, parameters of the first model and the second model may be adjusted or optimized based on a first loss function (e.g., Equation 1 above) of the first model and a second loss function (e.g., Equation 2 above) of the second model, i.e., a combined loss function. An example of the combined loss function is provided above with reference to Equation 3. Thus, end-to-end training of the first model (feature compressor) and the second model (e.g., deep-learning regressor) is achieved using combined loss, as opposed to a model pre-trained with unrelated datasets. As a result, the accuracy of the feature extraction and prediction of the data (e.g., molecular or RNA data) improves.

It may be appreciated that FIG. 4 provides only an illustration of one implementation and does not imply any limitations with regard to how different embodiments may be implemented. Many modifications to the depicted environments may be made based on design and implementation requirements.

Figure 5:
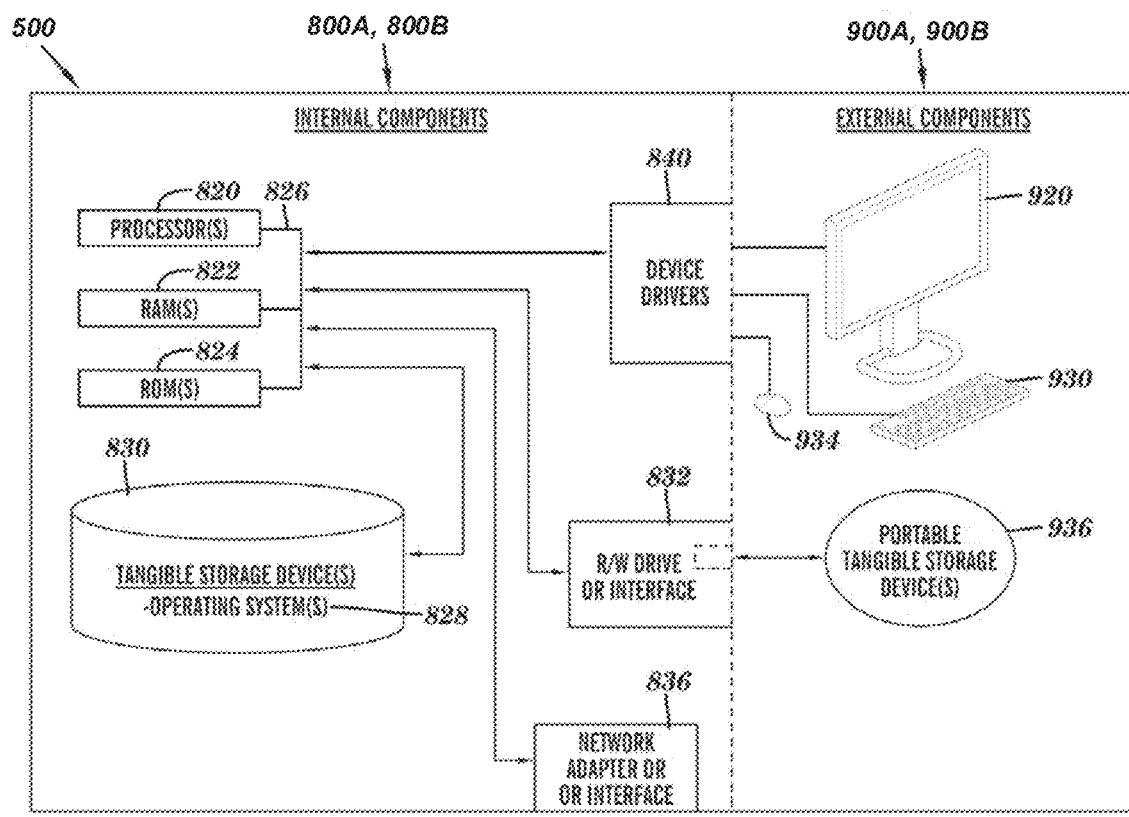
FIG. 5 is a block diagram of internal and external components of computers and servers depicted in FIG. 1 according to at least one embodiment.

FIG. 5 is a block diagram 500 of internal and external components of computers depicted in FIG. 1 in accordance with an illustrative embodiment. It should be appreciated that FIG. 5 provides only an illustration of one implementation and does not imply any limitations with regard to the environments in which different embodiments may be implemented. Many modifications to the depicted environments may be made based on design and implementation requirements.

Computer 102 (FIG. 1) and server computer 114 (FIG. 1) may include respective sets of internal components 800A,B and external components 900A,B illustrated in FIG. 5. Each of the sets of internal components 800 include one or more processors 820, one or more computer-readable RAMs 822 and one or more computer-readable ROMs 824 on one or more buses 826, one or more operating systems 828, and one or more computer-readable tangible storage devices 830.

Processor 820 is implemented in hardware, firmware, or a combination of hardware and software. Processor 820 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 820 includes one or more processors capable of being programmed to perform a function. Bus 826 includes a component that permits communication among the internal components 800A,B.

The one or more operating systems 828, the software program 108 (FIG. 1) and the Molecular Data Prediction Program 116 (FIG. 1) on server computer 114 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory, an optical disk, a magneto-optic disk, a solid state disk, a compact disc (CD), a digital versatile disc (DVD), a floppy disk, a cartridge, a magnetic tape, and/or another type of non-transitory computer-readable tangible storage device that can store a computer program and digital information.

Each set of internal components 800A,B also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the software program 108 (FIG. 1) and the Molecular Data Prediction Program 116 (FIG. 1) can be stored on one or more of the respective portable computer-readable tangible storage devices 936, read via the respective R/W drive or interface 832 and loaded into the respective hard drive 830.

Each set of internal components 800A,B also includes network adapters or interfaces 836 such as a TCP/IP adapter cards; wireless Wi-Fi interface cards; or 3G, 4G, or 5G wireless interface cards or other wired or wireless communication links. The software program 108 (FIG. 1) and the Molecular Data Prediction Program 116 (FIG. 1) on the server computer 114 (FIG. 1) can be downloaded to the computer 102 (FIG. 1) and server computer 114 from an external computer via a network (for example, the Internet, a local area network or other, wide area network) and respective network adapters or interfaces 836. From the network adapters or interfaces 836, the software program 108 and the Molecular Data Prediction Program 116 on the server computer 114 are loaded into the respective hard drive 830. The network may comprise copper wires, optical fibers, wireless transmission, routers, firewalls, switches, gateway computers and/or edge servers.

Each of the sets of external components 900A,B can include a computer display monitor 920, a keyboard 930, and a computer mouse 934. External components 900A,B can also include touch screens, virtual keyboards, touch pads, pointing devices, and other human interface devices. Each of the sets of internal components 800A,B also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, some embodiments are capable of being implemented in conjunction with any other type of computing environment now known or later developed.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of predicting data from an image, executable by a processor, comprising:
dividing a hematoxylin and eosin (H&E) image into one or more patch images;
compressing, using a first model, spatial features corresponding to the one or more patch images; and
predicting, using a second model, output molecular data corresponding to the compressed spatial features; and
adjusting parameters of the first model based on minimizing a first loss function corresponding to the compressed spatial features and adjusting parameters of the second model based on minimizing a second loss function corresponding to the compressed spatial features,
wherein the first loss function comprises a regression loss function corresponding to compressed feature expression images output by the first model based on the one or more patch images, and
wherein the second loss function comprises a feature compression loss function corresponding to second output data, output by the second model, indicated by the H&E image based on the compressed feature expression images.

2. The method of claim 1, wherein the compressing the spatial features comprises:
determining spatial arrangements corresponding to the compressed spatial features; and
generating a deep learning model based on the determined spatial arrangements.

3. The method of claim 1, wherein the compressing the spatial features comprises:
detecting a pathology associated with the H&E image;
identifying patch images corresponding to the detected pathology;
identifying normal patch images associated with the H&E image;
determining spatial arrangements corresponding to the normal patch images and the patch images corresponding to the detected pathology; and
generating or training a deep learning model based on the determined spatial arrangements.

4. The method of claim 1, wherein a patch image from among the one or more patch images comprises at least a portion of the H&E image and data corresponding to a location of the spatial features within the H&E image.

5. A computer system for predicting data from an image, the computer system comprising:
one or more computer-readable non-transitory storage media configured to store computer program code; and
one or more computer processors configured to access said computer program code and operate as instructed by said computer program code, said computer program code including:
dividing code configured to cause the one or more computer processors to divide a hematoxylin and eosin (H&E) image into one or more patch images;
compressing code of a first model configured to cause the one or more computer processors to compress spatial features corresponding to the one or more patch images;
predicting code of a second model configured to cause the one or more computer processors to predict output molecular data corresponding to the compressed spatial features; and
adjust parameters of the first model based on minimizing a first loss function corresponding to the compressed spatial features and adjust parameters of the second model based on minimizing a second loss function corresponding to the compressed spatial features,
wherein the first loss function comprises a regression loss function corresponding to compressed feature expression images output by the first model based on the one or more patch images, and
wherein the second loss function comprises a feature compression loss function corresponding to second output data, output by the second model, indicated by the H&E image based on the compressed feature expression images.

6. The computer system of claim 5, wherein the compressing code comprises:
determining code configured to cause the one or more computer processors to determine spatial arrangements corresponding to the compressed spatial features; and
generating code configured to cause the one or more computer processors to generate a deep learning model based on the determined spatial arrangements.

7. The computer system of claim 5, wherein the compressing code comprises:
detecting code configured to cause the one or more computer processors to detect a pathology associated with the H&E image;
first identifying code configured to cause the one or more computer processors to identify patch images corresponding to the detected pathology;
second identifying code configured to cause the one or more computer processors to identify normal patch images associated with the H&E image;
determining code configured to cause the one or more computer processors to determine spatial arrangements corresponding to the normal patch images and the patch images corresponding to the detected pathology; and
generating code configured to cause the one or more computer processors to generate a deep learning model based on the determined spatial arrangements.

8. The computer system of claim 5, wherein a patch image from among the one or more patch images comprises at least a portion of the H&E image and data corresponding to a location of the spatial features within the H&E image.

9. A non-transitory computer readable medium having stored thereon a computer program for predicting data from an image, the computer program configured to cause one or more computer processors to:
divide a hematoxylin and eosin (H&E) image into one or more patch images;
compress, using a first model, spatial features corresponding to the one or more patch images;
predict, using a second model, output molecular data corresponding to the compressed spatial features; and
adjust parameters of the first model based on minimizing a first loss function corresponding to the compressed spatial features and adjusting parameters of the second model based on minimizing a second loss function corresponding to the compressed spatial features,
wherein the first loss function comprises a regression loss function corresponding to compressed feature expression images output by the first model based on the one or more patch images, and
wherein the second loss function comprises a feature compression loss function corresponding to second output data, output by the second model, indicated by the H&E image based on the compressed feature expression images.

10. The non-transitory computer readable medium of claim 9, wherein the computer program is further configured to cause one or more computer processors to: determine spatial arrangements corresponding to the compressed spatial features; and generate a deep learning model based on the determined spatial arrangements.

11. The non-transitory computer readable medium of claim 9, wherein the computer program is further configured to cause one or more computer processors to: detect a pathology associated with the H&E image; identify patch images corresponding to the detected pathology; identify normal patch images associated with the H&E image; determine spatial arrangements corresponding to the normal patch images and the patch images corresponding to the detected pathology; and generate a deep learning model based on the determined spatial arrangements.

* * * * *